United States Patent
Alberty et al.

(10) Patent No.: US 7,431,106 B2
(45) Date of Patent: Oct. 7, 2008

(54) DRILLING METHOD

(75) Inventors: Mark William Alberty, Houston, TX (US); Mark Shelton Aston, Middlesex (GB); Michael Richard Mclean, Middlesex (GB)

(73) Assignees: BP Exploration Operating Company Limited, Middlesex (GB); BP Corporation North America Inc., Warrenville, IL (US)

( * ) Notice: Subject to any disclaimer, the term of this patent is extended or adjusted under 35 U.S.C. 154(b) by 289 days.

(21) Appl. No.: 10/565,625

(22) PCT Filed: Jul. 19, 2004

(86) PCT No.: PCT/GB2004/003154

§ 371 (c)(1),
(2), (4) Date: Jan. 24, 2006

(87) PCT Pub. No.: WO2005/012687

PCT Pub. Date: Feb. 10, 2005

(65) Prior Publication Data

US 2006/0254826 A1   Nov. 16, 2006

Related U.S. Application Data

(60) Provisional application No. 60/489,917, filed on Jul. 25, 2003.

(51) Int. Cl.
*E21B 33/13* (2006.01)
*E21B 43/26* (2006.01)

(52) U.S. Cl. .................... 175/72; 166/283; 507/140

(58) Field of Classification Search .................. None
See application file for complete search history.

(56) References Cited

U.S. PATENT DOCUMENTS 4,217,965 A   8/1980   Cremeans (Continued)

FOREIGN PATENT DOCUMENTS

CA   810131   4/1969

(Continued)

OTHER PUBLICATIONS

Fuh, Giin-Fa, et al; "A New Approach to Preventing Lost Circulation While Drilling"; SPE 24599; *Society of Petroleum Engineers* (1992) pp. 569-582.

(Continued)

*Primary Examiner*—Zakiya W. Bates
(74) *Attorney, Agent, or Firm*—Nixon & Vanderhye

(57) ABSTRACT

A method of reducing formation breakdown during the drilling of a wellbore which method comprises: (a) circulating a drilling mud in the wellbore comprising (i) an aqueous or oil based fluid, (ii) at least one fluid loss additive at a concentration effective to achieve a high temperature high pressure (HTHP) fluid loss from the drilling mud of less than 2 ml/30 minutes and (iii) a solid particulate bridging material having an average particle diameter of 25 to 2000 microns and a concentration of at least 0.5 pounds per barrel; (b) increasing the pressure in the wellbore to above the initial fracture pressure of the formation such that fractures are induced in the formation and a substantially fluid impermeable bridge comprising the solid particulate bridging material and the fluid loss additive(s) is formed at or near the mouth of the fractures thereby strengthening the formation; (c) thereafter continuing to drill the wellbore with the pressure in the wellbore maintained at above the initial fracture pressure of the formation and below the breakdown pressure of the strengthened formation.

25 Claims, 1 Drawing Sheet

U.S. PATENT DOCUMENTS

| | | | |
|---|---|---|---|
| 4,422,948 A | 12/1983 | Corley et al. | |
| 4,608,182 A | 8/1986 | Dickert, Jr. et al. | |
| 4,710,586 A | 12/1987 | Patel et al. | |
| 4,957,174 A | 9/1990 | Whitfill et al. | |
| 5,054,554 A | 10/1991 | Pearson | |
| 5,094,762 A | 3/1992 | Lahalih | |
| 5,180,020 A | 1/1993 | Fuh et al. | |
| 5,207,282 A | 5/1993 | Fuh et al. | |
| 6,100,222 A * | 8/2000 | Vollmer et al. | 507/113 |
| 6,391,830 B1 | 5/2002 | Dobson, Jr. et al. | |
| 6,403,537 B1 | 6/2002 | Chesser et al. | |
| 6,976,537 B1 * | 12/2005 | Verret | 166/294 |

FOREIGN PATENT DOCUMENTS

| | | | |
|---|---|---|---|
| EP | 1 074 598 A1 | 2/2001 | |
| GB | 2 120 302 A | 11/1983 | |
| GB | 2 351 098 A | 12/2000 | |

OTHER PUBLICATIONS

Aston, M., et al; "Towards Zero Fluid Loss Oil Based Muds"; SPE 77446, *Society of Petroleum Engineers* (2002) pp. 1-9.

Aston, M., et al; "Drilling Fluids for Wellbore Strengthening"; SPE/IADC 87130; *Society of Petroleum Engineers* (2004) pp. 1-9.

Kelley, S., et al; "Treatments Increase Formation Pressure Integrity in HTHP Wells"; *American Associates of Drilling Engineers* (2001) pp. 1-13.

Sweatman, R., et al; "Formation Pressure Integrity Treatments Optimize Drilling and Completion of HTHP Production Hole Sections"; SPE 68946; *Society of Petroleum Engineers* (2001) pp. 1-13.

* cited by examiner

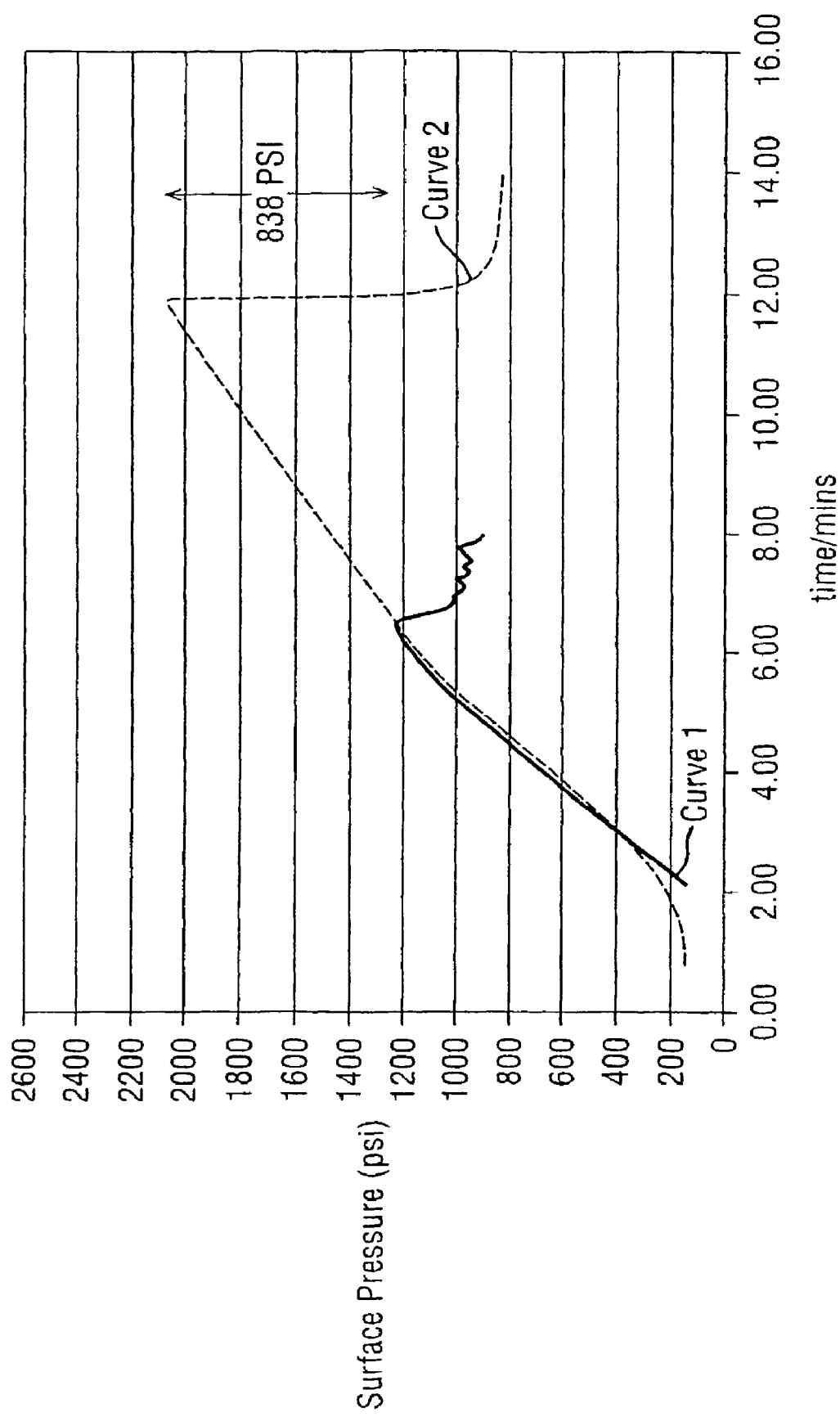

DRILLING METHOD

This application is the U.S. National Phase of International Application PCT/GB04/003154, filed 19 Jul. 2004, which designated the U.S. PCT/GB04/003154 claims priority to U.S. Provisional Application No. 60/489,917 filed 25 Jul. 2003. The entire content of these applications are incorporated herein by reference.

The present invention relates to drilling of wells through a subterranean formation, and more particularly to a method of increasing the resistance of the wellbore wall to fracturing during drilling operations.

Conventionally, the drilling of a well into the earth by rotary drilling techniques, involves the circulation of a drilling fluid from the surface of the earth down a drill string having a drill bit on the lower end thereof and through ports provided in the drill bit to the well bottom and thence back to the surface through the annulus formed about the drill string. Commonly, drilling fluids are employed that are either oil or water based. These fluids are treated to provide desired rheological properties which make the fluids particularly useful in the drilling of wells.

A problem often encountered in the drilling of a well is the loss of unacceptably large amounts of drilling fluid into subterranean formations penetrated by the well. This problem is often referred to generally as "lost circulation," and the formations into which the drilling fluid is lost are often referred to as "lost circulation zones" or "thief zones". Various causes may be responsible for the lost circulation encountered in the drilling of a well. For example, a formation penetrated by the well may exhibit unusually high permeability or may contain fractures or crevices therein. In addition, a formation may simply not be sufficiently competent to support the pressure applied by the drilling fluid and may break down under this pressure and allow the drilling fluid to flow thereinto.

It is this latter situation where the formation is broken down by the pressure of the drilling fluid to which the present invention is addressed. One of the limiting factors in drilling a particular portion of a well is the mud weight (density of the drilling fluid) that can be used. If too high a mud weight is used, fractures are created in the wall of the borehole with resulting loss of drilling fluid and other operating problems. On the other hand, if too low a mud weight is used, encroachment of formation fluids can occur, borehole collapse may occur due to insufficient support from the fluid pressure in the wellbore, and in extreme cases safety can be compromised due to the possibility of a well blowout. In many cases, wells are drilled through weak or lost-circulation-prone zones prior to reaching a potential producing zone, requiring use of a low mud weight and installation of sequential casing strings to protect weaker zones above a potential producing zone. If a higher weight mud could be used in drilling through weaker or depleted zones, then there is a potential for eliminating one or more casing strings in the well. Elimination of even one casing string from a well provides important savings in time, material and costs of drilling the well. Thus, there is a need for a method of drilling boreholes using a higher mud weight than could normally be used without encountering formation breakdown problems.

Surprisingly, it has now been found that formation breakdown during drilling can be controlled by drilling the borehole using an ultra-low fluid loss mud with the pressure of the drilling mud maintained at above the initial fracture pressure of the formation wherein the fractures that are induced in the wellbore wall are bridged at or near the mouth thereof by a solid particulate material that is added to the drilling mud and the bridge is sealed by the accumulation of fluid loss additives in the voids between the bridging particles and/or the precipitation of fluid loss additives onto the bridging particles. The presence of the fluid impermeable bridge at or near the mouth of the fracture strengthens the near wellbore region of the formation by generating a stress cage. Thereafter, the drilling of the wellbore is continued with the pressure of the drilling mud maintained at below the breakdown pressure of the strengthened formation.

Thus, according to a first aspect of the present invention there is provided a method of reducing formation breakdown during the drilling of a wellbore which method comprises:

(a) circulating a drilling mud in the wellbore comprising (i) an aqueous or oil based fluid, (ii) at least one fluid loss additive at a concentration effective to achieve a high temperature high pressure (HTHP) fluid loss from the drilling mud of less than 2 ml/30 minutes and (iii) a solid particulate bridging material having an average particle diameter of 25 to 2000 microns and a concentration of at least 0.5 pounds per barrel (1.43 kg/m$^3$);

(b) increasing the pressure in the wellbore to above the initial fracture pressure of the formation such that fractures are induced in the formation and a substantially fluid impermeable bridge comprising the solid particulate material and the fluid loss additive(s) is formed at or near the mouth of the fractures thereby strengthening the formation;

(c) thereafter continuing to drill the wellbore with the pressure in the wellbore maintained at above the initial fracture pressure of the formation and below the breakdown pressure of the strengthened formation.

For avoidance of doubt, the strengthened formation may be a permeable or non-permeable formation.

Without wishing to be bound by any theory, the mechanism by which the method of the present invention strengthens the wall of the wellbore and hence reduces formation breakdown is that as a fracture is deliberately induced in the wellbore wall, the solid particulate material enters and bridges the fracture at or near the mouth of the fracture. Additives which are conventionally included in the drilling mud to reduce loss of fluid from the drilling mud into the formation subsequently either precipitate on the solid particulate material that bridges the fracture or fill the voids between the solid particulate material thereby establishing a fluid impermeable immobile mass or bridge at or near the mouth of the fracture. Accordingly, fluid from the drilling mud can no longer pass into the fracture and the pressure within the fracture may begin to dissipate until it is substantially the same as the pressure of the surrounding formation. The rate of reduction in pressure within the fracture beyond the bridge will depend on the rock permeability and other factors such as the supporting action of the bridge which maintains the rock displacement caused by the fracture and the sealing action of the bridge which prevents fluid loss from the drilling mud into the fracture. The rock displacement caused by the fracture places the rock in the near wellbore region of the formation (for example, within a radial distance of up to 5 feet (1.524 meters) from the wellbore wall) in a state of compression, thereby increasing the "hoop stress" and generating a "stress cage". If there is a reduction in pressure in the fracture beyond the bridge, the fracture will attempt to close and this will impart stress on the fluid impermeable immobile mass or bridge which, in turn, leads to additional compressive stress being imparted to the rock in the near wellbore region of the formation. The increased compressive stress in the near wellbore region of the formation results in the wall of the wellbore having a greater resistance to further fracturing. The method of the present invention therefore allows a drilling mud of higher density to be employed in drilling the wellbore than could be used in the absence of strengthening of the formation. The method also has a further beneficial effect of reducing loss of fluid from the drilling mud into the formation owing to the sealing of the fractures with the fluid impermeable immobile mass.

The method of the first aspect of the present invention differs from a conventional "tip screen out" in that a "tip screen out" requires the use of a high fluid loss drilling mud so that particulate material accumulates rapidly at the fracture tip thereby sealing the fracture and preventing further propagation of the fracture. The person skilled in the art would therefore have concerns that the use of an ultra-low fluid loss drilling mud would slow down deposition of particulate material at the fracture tip. Furthermore, there was no understanding that it may be preferable to bridge at or near the mouth of a fracture. Thus, conventional drilling muds employed in a "tip screen out" are designed so that the particulate material readily penetrates into the fracture to deposit at the fracture tip. Also, a "tip screen out" does not create an effective near wellbore "stress cage". Although the rock at the fracture tip would be under increased compressive stress (owing to the accumulation of particulate material at the fracture tip), this would not apply to the rock between the fracture tip and the mouth of the fracture. Finally, there was a prejudice against using a low fluid loss drilling mud owing to a belief that a low fluid loss mud would slow down the "rate of penetration" while drilling. It was therefore surprising that an ultra-low fluid loss mud does not significantly reduce the "rate of penetration".

The fluid loss value for the drilling mud is determined using a standard high temperature high pressure (HTHP) fluid loss test, according to the specifications of the American Petroleum Institute (API), as described in "Recommended Practice Standard Procedure for Field Testing Oil-Based Drilling Fluids", API Recommended Practice 13B-2 Third Edition, February 1998, Section 5.2.1 to 5.2.3; and "Recommended Practice Standard Procedure for Field Testing Water-Based Drilling Fluids", API Recommended Practice 13B-1 Second Edition, September 1997, Section 5.3.1 to 5.3.2. The test employs a pressurized cell fitted with a standard hardened filter paper as a filtration medium. The filtration behaviour of the drilling mud is determined with a standard pressure differential across the filter paper of 500 psi (3.45 M Pa). A filter cake is allowed to build up on the filter paper for 30 minutes and the volume of filtrate collected after this 30 minute period is then recorded. Because the filtration area (3.5 square inches $(2.258 \times 10^{-3} \text{ m}^2)$) of the pressurized cell is half the filtration area of a standard API low temperature low pressure (LTLP) fluid loss test (7 square inches $(4.516 \times 10^{-3} \text{ m}^2)$), the filtrate volume after 30 minutes is doubled to give a corrected API fluid loss value. Suitably, the temperature at which the high temperature high pressure (HTHP) fluid loss test is carried out corresponds to the temperature in the borehole. Generally, the test temperature is in the range 50 to 150° C.

By "fracture pressure" is meant the minimum fluid pressure in the wellbore at which a fracture is created in the wellbore wall. As would be evident to the person skilled in the art, creation of a near wellbore "stress cage" will increase the fracture pressure of the strengthened formation. Accordingly, by "initial fracture pressure" of a formation is meant the fracture pressure of the formation prior to creation of the "stress cage". The initial fracture pressure of a formation may be readily determined, for example, from historical data.

By "breakdown pressure of the strengthened formation" is meant the maximum fluid pressure that can be sustained within the wellbore without creating a fracture in the strengthened formation and/or without breaking down the fluid impermeable bridge(s) that has been formed at or near the mouth of the fracture(s).

Suitably, the pressure in the wellbore in step (c) of the method of the first aspect of the present invention is at least 50 psi (0.34 M Pa) above the initial fracture pressure of the formation, preferably, at least 300 psi (2.07 M Pa) above the initial fracture pressure of the formation, for example 300 to 1000 psi (2.07 to 6.90 M Pa) above the initial fracture pressure of the formation, with the proviso that the pressure in the wellbore in step (c) is below the breakdown pressure of the strengthened formation.

As is well known to the person skilled in the art, formation pressure generally increases with increasing depth of the wellbore. It is therefore generally necessary to continuously increase the pressure of the drilling mud during the drilling operation, for example, by increasing the density of the drilling mud. A problem arises when the increased pressure of the drilling mud exceeds the initial fracture pressure of a previously drilling formation or exceeds the initial fracture pressure of a formation that is yet to be drilled (hereinafter referred to as "weak formation"). The method of the first aspect of the present invention may therefore be used to strengthen such weak formations thereby allowing the pressure of the drilling mud that is employed for completing the drilling operation to be increased to above the initial fracture pressure of the weak formation. The method of the first aspect of the present invention is particularly advantageous where the weak formation is a depleted formation i.e. a formation having a decreased pore pressure owing to production of hydrocarbons therefrom. This decrease in pore pressure weakens the depleted formation while neighbouring or interbedded low permeability formations may maintain their pore pressure.

Thus, in a specific embodiment of the first aspect present invention there is provided a method of reducing formation breakdown during the drilling of a wellbore through a weak formation with a circulating drilling mud which method comprises:

(a) circulating in a wellbore a drilling mud comprising (i) an aqueous or oil based fluid, and (ii) at least one fluid loss additive at a concentration effective to achieve a high temperature high pressure (HTHP) fluid loss from the drilling mud of less than 2 ml/30 minutes and (iii) a solid particulate bridging material having an average particle diameter of 25 to 2000 microns and a concentration of at least 0.5 pounds per barrel (1.43 kg/m$^3$);

(b) increasing the pressure of the drilling mud to above the initial fracture pressure of the weak formation such that fractures are induced in the weak formation and a substantially fluid impermeable bridge comprising the solid particulate material and the fluid loss additive(s) is formed at or near the mouth of the fractures thereby strengthening the weak formation;

(c) thereafter continuing to drill the wellbore with the pressure in the wellbore maintained at above the initial fracture pressure of the weak formation and below the breakdown pressure of the strengthened formation.

It is envisaged that the wellbore may be drilled using a conventional drilling mud until the pressure in the wellbore approaches the initial fracture pressure of the weak formation. The conventional drilling mud is then replaced by (or converted into) the drilling mud employed in step (a) before increasing the pressure in the wellbore to above the initial fracture pressure of the weak formation. The conventional drilling mud may be converted into the drilling mud employed in step (a) by adding at least one fluid loss additive (ii) to the mud until the HTHP fluid loss value of the mud is less than 2 ml/30 minutes and adding the solid particulate bridging material (iii) to the mud in an amount of at least 0.5 pound per barrel (1.43 kg/m$^3$). Suitably, the solid particulate bridging material (iii) may be added to a drilling mud comprising components (i) and (ii) immediately before increasing the pressure of the drilling mud to above the initial fracture pressure of the weak formation. Thus, the drilling mud that is used to drill the wellbore until the pressure in the wellbore approaches the initial fracture pressure of the weak formation may comprise components (i) and (ii) in the absence of component (iii).

The weak formation may lie in a previously drilled section of the wellbore and/or in the rock that is about to be drilled. Where the weak formation is in the rock that is about to be drilled, it is necessary to replace the entire wellbore fluid with the drilling mud employed in step (a). Thus, the weak formation is strengthened as the wellbore is being drilled. Where the weak formation lies in a previously drilled section of the wellbore, it is only necessary to replace the wellbore fluid in the vicinity of the weak formation. Thus, a drilling mud having a high concentration of the particulate solid material may be introduced into the wellbore as a "pill" and may be circulated to the weak formation where the concentrated drilling mud composition is squeezed into the weak formation at a pressure above the initial fracture pressure of the weak formation so that the bridging particulate material bridges the fractures that are induced in the wellbore wall at or near the mouth thereof. Typically, the pill is squeezed into the weak formation by sealing the annulus between a drill string and the wellbore wall, raising the drill string until it lies immediately below the weak formation, and pumping the pill into the wellbore via the drill string until the pressure in the vicinity of the weak formation is greater than the initial fracture pressure. Generally, the well is then shut in for a period of up to 0.5 hour. After strengthening the weak formation, drilling of the wellbore may be continued using a conventional drilling mud with the proviso that the pressure in the wellbore in the vicinity of the strengthened formation is maintained below the breakdown pressure of the strengthened formation. Suitably, the concentration of bridging material in the pill should be at least 50 pounds per barrel (143 kg/m$^3$), preferably at least 80 lb per barrel (228.8 kg/m$^3$). It is also envisaged that the "pill" may be employed as a completion fluid and may be pumped into the wellbore in advance of a cement when casing a wellbore.

In a further aspect of the present invention there is provided a drilling mud composition comprising (a) an aqueous or oil based fluid, (b) at least one fluid loss additive at a concentration effective to achieve a high temperature high pressure (HTHP) fluid loss from the drilling mud of less than 2 ml/30 minutes and (c) a solid particulate bridging material having an average particle diameter of 25 to 2000 microns and a concentration of at least 0.5 pounds per barrel (1.43 kg/m$^3$).

Suitably, the specific gravity of the drilling mud is in the range 0.9 to 2.5, preferably in the range 1.0 to 2.0.

Suitably, the solid particulate bridging material that is included in the drilling mud to bridge the fractures (hereinafter "bridging material") comprises at least one substantially crush resistant particulate solid such that the bridging material props open the fractures (cracks and fissures) that are induced in the wall of the wellbore. By "crush resistant" is meant that the bridging material is physically strong enough to withstand the closure stresses exerted on the fracture bridge. Preferred bridging materials for adding to the drilling mud include graphite, calcium carbonate (preferably, marble), dolomite ($MgCO_3.CaCO_3$), celluloses, micas, proppant materials such as sands or ceramic particles and combinations thereof. These materials are very inert and are environmentally acceptable. It is also envisaged that a portion of the bridging material may comprise drill cuttings having the desired average particle diameter in the range of 25 to 2000 microns.

The concentration of the bridging material may vary with the drilling mud used and the conditions of use. The concentration must be at least great enough for the bridging material to rapidly bridge the fractures (i.e. cracks and fissures) that are induced in the wall of the wellbore but should not be so high as to make circulation of the drilling mud impractical. Suitably, the bridging material should bridge the fractures that are induced in the wellbore wall within less than 10 seconds, preferably less than 5 seconds from when the fracture opens so that the fracture remains short. Thus, rapid sealing of the fracture mitigates the risk of the fracture propagating. Suitably, the concentration of bridging material in the drilling mud is at least 5 pounds per barrel (14.3 kg/m$^3$), preferably at least 10 pounds per barrel (28.6 kg/m$^3$), more preferably at least 15 pounds per barrel (42.9 kg/m$^3$), for example, at least 30 pounds per barrel (85.8 kg/m$^3$). However, as discussed above, where the drilling mud is employed in a "pill" treatment, the concentration of the bridging particulate material is suitably at least 50 pounds per barrel (143 kg/m$^3$), preferably at least 80 pounds per barrel (228.8 kg/m$^3$).

Suitably, the bridging material is sized so as not to enter the pores of any permeable rock through which the wellbore is being drilled. Preferably, the bridging material has an average particle diameter in the range 50 to 1500 microns, more preferably 250 to 1000 microns. The bridging material may comprise substantially spherical particles. However, it is also envisaged that the bridging material may comprise elongate particles, for example, rods or fibres. Where the bridging material comprises elongate particles, the average length of the elongate particles should be such that the elongate particles are capable of bridging the induced fractures at or near the mouth thereof. Typically, the elongate particles will have an average length in the range 25 to 2000 microns, preferably 50 to 1500 microns, more preferably 250 to 1000 microns.

The bridging material is sized so as to readily form a bridge at or near the mouth of the induced fractures. Typically, the fractures that are induced in the wellbore wall have a fracture width at the mouth in the range 0.1 to 5 mm. The fracture width is dependent, amongst other factors, upon the strength (stiffness) of the formation rock and the extent to which the pressure in the wellbore is increased to above initial fracture pressure of the formation during the fracture induction step (b) of the method of the present invention (in other words, the fracture width is dependent on the pressure difference between the drilling mud and the initial fracture pressure of the formation during the fracture induction step). It is preferred that at least a portion of the bridging material, preferably, a major portion of the bridging material has a particle diameter approaching the width of the fracture mouth. Preferably, the bridging material has a broad (polydisperse) particle size distribution.

It is necessary to keep the bridging material in suspension in the drilling mud.

Generally, a drilling mud is recycled to the wellbore after removal of substantially all of the drill cuttings. The drill cuttings may be removed using screens as would be well known to the person skilled in the art. Typically the drilling mud is filtered using a 200 mesh size screen (US sieve series) that retains particles having a size of greater than 74 microns. However, in the method of the present invention, it is necessary to filter the mud using a coarser screen so as to avoid separation of substantial amounts of the bridging material from the mud. Suitably, the drilling mud is filtered using a 35 mesh screen (US sieve series) that retains particles having a size of greater than 500 microns. However, if the rheology of the mud deteriorates through the accumulation of fine drill cuttings in the mud, it may be necessary to employ finer mesh screens for a short period of time. It is also envisaged that separation methods may be employed which allow the bridging solids to be retained but a major portion of the cuttings, preferably substantially all of the cuttings, to be separated from the drilling mud. In particular, the cuttings may be separated from the drilling mud by relying on differences in the densities of the cuttings and the bridging particles, for example, using centrifuges or hydrocyclones. In order to maintain the concentration of the bridging material at the desired value in the drilling mud and/or to maintain the fluid loss value of the drilling mud at below 2 ml/30 minutes, it may be necessary to introduce fresh bridging material and/or fresh fluid loss additives respectively into the circulating drilling mud. Alternatively, or in addition, fresh drilling mud may be either continuously or intermittently added to the drilling mud that is being circulated in the wellbore.

The drilling mud has an HTHP fluid loss value of less than 2 ml/30 minutes, preferably, less than 1 ml/30 minutes, more preferably less than 0.5 ml/30 minutes, for example 0.1 to 0.3 ml/30 minutes. As would be well known to the person skilled in the art, such ultra-low fluid loss values may be achieved by incorporating at least one fluid loss additive in the drilling mud. Without wishing to be bound by any theory, it is believed that the fluid loss additive(s) will build up on the solid particulate material that bridges the fractures at or near the mouth thereof thereby forming a fluid impermeable immobile mass. Where the solid particulate bridging material is porous, the fluid loss additives may also enter the pores of the bridging material to seal the pores.

Suitable fluid loss additives that may be incorporated in the drilling mud of the present invention include organic polymers of natural or synthetic origin. Suitable polymers include starch or chemically modified starches; cellulose derivatives such as carboxymethylcellulose and polyanionic cellulose (PAC); guar gum and xanthan gum; homopolymers and copolymers of monomers selected from the group consisting of acrylic acid, acrylamide, acrylamido-2-methyl propane sulfonic acid (AMPS), styrene sulphonic acid, N-vinyl acetamide, N-vinyl pyrrolidone, and N,N-dimethylacrylamide wherein the copolymer has a number average molecular weight of from 100,000 to 1,000,000, and preferably 200,000 to 500,000; asphalts (for example, sulphonated asphalts); gilsonite; lignite and its derivative, humic acid; lignin and its derivatives such as lignin sulfonates or condensed polymeric lignin sulfonates; and combinations thereof. These polymeric additives are particularly suitable for use in oil based drilling muds. As an alternative or, in addition, to employing such polymeric additives, the fluid loss from the drilling mud of the present invention may be reduced by adding finely dispersed particles such as clays (for example, illite, kaolinite, bentonite, or sepiolite) to the drilling mud. Suitably, the finely dispersed particles have an average particle size of less than 10 microns, preferably, less than 5 microns, for example, about 1 micron. Preferably, the drilling mud contains a smooth/continuous range of particle sizes ranging from about 1 micron for the finely dispersed particulate fluid loss additives to an average particle diameter of the bridging material of up to 2000 microns i.e. has a broad (polydisperse) particle size distribution.

It is envisaged that an oil based drilling mud may contain a significant amount of a discontinuous water phase dispersed in a continuous oil phase by means of at least one emulsifier (a water-in-oil emulsion). The fluid loss value of such drilling muds may vary depending upon the oil to water ratio and the nature of the emulsifier(s) employed to form the water-in-oil emulsion (and hence on the size of the dispersed water droplets). Preferably, the water content of the drilling mud is in the range 80:20 to 50:50, more preferably 70:30 to 55:45. Preferred emulsifiers include imidazolines, fatty acids and combinations thereof.

Particularly preferred ultra-low fluid loss oil based drilling muds are described in SPE 77446, "Towards Zero Fluid Loss Oil Based Muds", M Aston, P Mihalik, J Tunbridge and S Clarke, published 2002.

The effectiveness of the method of the present invention has been demonstrated in both laboratory and field conditions as shown by the following Examples.

EXAMPLE 1

Oil based mud formulations were evaluated in the laboratory by injecting different drilling muds into a model fracture (as described in SPE/IADC 87130, "Drilling Fluids for Wellbore Strengthening, 2-4 Mar. 2004, M S Aston et al). The model fracture was formed from two rectangular-shaped rock pieces (of 0.3 milliDarcy permeability "Ohio" sandstone). Each rock piece had approximate dimensions of 5 cm width× 20 cm length×1 cm breadth. The two rock pieces were sandwiched together to create a fracture having a mouth aperture of 1 mm with the aperture of the fracture tapering to 0.5 mm at the far end thereof (fracture tip). A valve was provided at the exit from the fracture tip such that the fracture tip could be open or sealed. The rock sandwich was placed in a purpose-built holder that was supported in a load frame within a test cell. The fracture width was maintained constant using fixed spacers. The fluid pressure within the fracture was measured just inside the mouth of the fracture using a pressure transducer. Initially, the fracture and the pore spaces in the rock were filled with a clear fluid (water) and the system was heated to a temperature of 60° C. A pressure of about 100 psi (0.69 M Pa) was applied to compress any air in the system. Drilling mud was then injected at a pressure of 400 psi (2.76 M Pa) into the mouth of the fracture with the fracture tip open (to give a differential pressure across the fracture of 300 psi (2.07 M Pa)). After 3 minutes, the exit from the fracture tip was closed using the valve so that pressure could build up inside the fracture (n.b. the initial driving force for bridge formation at the fracture mouth was fluid leak-off through the fracture tip). The injection pressure was then increased stepwise to 2000 psi (13.79 M Pa). A low pressure measured on the pressure transducer indicated an effective seal at the mouth of the fracture.

The results shown in Table 1 below compare the pressures measured just inside the fracture mouth for different drilling muds employed in the above test procedure. The pressure just inside the fracture mouth was measured after a steady value was reached at each injection pressure.

TABLE 1

Effectiveness of drilling muds in sealing a model fracture

| Mud System | | Pressure just inside fracture mouth, measured after different mud injection pressures (IP) in psi | | |
|---|---|---|---|---|
| | | IP 400 (2.76 M Pa) | IP 1000 (6.70 M Pa) | IP 2000 (13.79 M Pa) |
| Mud 1 (Comparative) | Base mud plus bridging particulate material mix A; API HTHP fluid loss = 3 mls/30 minutes at a temperature of 60° C. | 300 (2.07 M Pa) | 900 (6.21 M Pa) | 1900 (13.10 M Pa) |
| Mud 2 | As mud 1, but containing 5 lb/bbl Pliolite, API HTHP fluid loss = 0.3 mls/30 minutes at a temperature of 60° C. | 0 | 30 (1.31 M Pa) | 1900 (13.10 M Pa) |
| Mud 3 | Base mud plus bridging particulate material mix B plus 5 lb/bbl Pliolite, API HTHP fluid loss = 0.1 mls/30 minutes at a temperature of 60° C. | 0 | 0 | 0 |

Mud 2 forms a more effective seal than Mud 1 (Comparative). This was achieved by reducing the API HTHP fluid loss of the mud system from 3 ml/30 minutes to 0.3 mls/30 minutes. Mud 3 achieved a total seal at the mouth of the fracture by using an improved bridging particulate material mix in a mud having an API HTHP fluid loss of 0.1 mls/30 minutes.

The formulation for the base mud employed in the above tests was as follows:

| | |
|---|---|
| Mineral oil: | 0.517 bbls (0.0822 m³) |
| Versamul ™ (emulsifier, ex MI) | 4.7 lb/bbl (13.4 kg/m³) |
| Versawet ™ (wetting agent, ex MI) | 7 lb/bbl (20.0 kg/m³) |
| Geltone ™ (organoclay, ex Halliburton) | 6 lb/bbl (17.2 kg/m³) |
| Lime | 5.25 lb/bbl (15.0 kg/m³) |
| Calcium chloride | 17.6 lb/bbl (50.4 kg/m³) |
| Water | 0.346 lb/bbl (1.0 kg/m³) |
| Barite (barium sulfate) | 50 lb/bbl (143 kg/m³) |
| Hymod Prima Clay (simulated drill solids) | 4.5 lb/bbl (12.9 kg/m³) |

Mud 1 is the base mud containing the following bridging particulate materials (mix A):

| | |
|---|---|
| Baracarb ™ 150: | 46 lb/bbl (131.6 kg/m³) |
| Baracarb ™ 600: | 9.3 lb/bbl (26.6 kg/m³) |

Mud 2 is as Mud 1 with the addition of 5 lb/bbl Pliolite® DF-01 (fluid loss control additive supplied by Goodyear)

Mud 3 is the base mud containing 5 lb/bbl (143 kg/m³) Pliolite® DF-01 and the following bridging particulate materials (mix B):

| | |
|---|---|
| Baracarb ™ 150: | 18 lb/bbl (51.5 kg/m³) |
| Baracarb ™ 600: | 18 lb/bbl (51.5 kg/m³) |
| Steelseal ™: | 15 lb/bbl (42.9 kg/m³) |

Baracarb™ 150, Baracarb™ 600 and Steelseal™ were obtained from Halliburton. Baracarb™ 150 and Baracarb™ 600 are calcium carbonates with an average particle diameter of 150 microns and 600 microns, respectively. Steelseal™ is a graphitic carbon available from Halliburton, with an average size range of approximately 400 microns.

EXAMPLE 2

A field test was conducted onshore in the Arkoma basin, USA, to determine whether the method of the present invention could raise fracture resistance in a shale formation. The well was a vertical well having a 9⅝" (24.5 cm) casing. An extended leak off test (pill squeeze treatment) was performed in 10 feet (3.048 meters) of exposed shale formation (open hole) just below the 9⅝" (24.5 cm) casing shoe. In this test, standard "leak-off" procedures were used whereby the annulus was closed whilst mud was pumped into the wellbore. Initially, a standard diesel based mud was present in the well bore and this mud was pumped into the wellbore at a rate of 0.25 bbls/minute (0.04 m³/minute) until breakdown of the exposed shale formation occurred.

FIG. 1 illustrates the extended leak-off pressure curve for the standard diesel based mud (curve 1). The shale formation fractured at about 1200 psi (8.27 M Pa), at which point pumping of the standard diesel based drilling mud was stopped to minimize fracture growth. The pressure stabilized at 800 psi (5.52 M Pa), which is the propagation pressure of the fractures determined by the far-field stress state. The excess pressure in the wellbore was bled off (back to hydrostatic pressure) so that the fractures closed and the leak-off procedure was then repeated by pumping a pill of a mud according to the present invention (hereinafter "Designer mud") into the wellbore also at a rate of 0.25 bbls/minute (0.04 m³/minute). FIG. 1 additionally illustrates the extended leak off curve for the Designer mud (curve 2). The fractures induced in the wall of the open hole wellbore are bridged and sealed by the bridging particles and fluid loss additives of the Designer mud and the breakdown pressure of the strengthened formation climbs to above 2000 psi (13.79 M Pa) before the seal breaks down. This is an increase of about 850 psi (5.86 M Pa) formation breakdown pressure compared to the original state of the shale formation, equivalent to 5.4 pounds per gallon (ppg) (647 kg/m³) mud weight.

The API HTHP fluid loss value for the Designer mud employed in the field trial was 0.45 mls at a temperature of 115° F. (46° C.) (bottom hole temperature), while the standard diesel based mud had an API HTHP fluid loss of 10 mls at a temperature of 250° F. (121° C.). The Designer Mud was made by adding calcium carbonate bridging solids, graphitic material bridging solids, and fluid loss additives to the standard diesel based mud in accordance with the present invention. The bridging solids ranged in size from 10 to 800 microns and were added in an amount of 80 pounds per barrel (228.8 kg/m³). The original standard diesel based mud had a mud weight of 9.0 ppg (1078 kg/m³) and was free of added bridging solids.

The invention claimed is:

1. A method of reducing formation breakdown during the drilling of a wellbore which method comprises:
   (a) circulating a drilling mud in the wellbore comprising (i) an aqueous or oil based fluid, (ii) at least one fluid loss additive at a concentration effective to achieve a high temperature high pressure (HTHP) fluid loss from the drilling mud of less than 2 ml/30 minutes wherein the HTHP fluid loss is determined using an HTHP test according to the specification of the American Petroleum Institute (API) that employs a pressurized cell fitted with a filtration medium comprising a standard hardened filter paper having a filtration area of 3.5 square inches ($2.258 \times 10^{-3}$ m$^2$) wherein the drilling mud is filtered using the cell at a temperature corresponding to the temperature in the wellbore and with a standard pressure differential across the filter paper of 500 psi (3.45 MPa) and wherein a filter cake is allowed to build up on the filter paper for a period of 30 minutes, and the volume of filtrate collected after this 30 minute period is doubled to give corrected American Petroleum Institute (API) fluid loss value, and (iii) a solid particulate bridging material having an average particle diameter of 25 to 2000 microns and a concentration of at least 0.5 pounds per barrel (1.43 kg/m$^3$);
   (b) increasing the pressure in the wellbore to above the initial fracture pressure of the formation such that fractures are induced in the formation and a substantially fluid impermeable bridge comprising the solid particulate bridging material and the fluid loss additive(s) is formed at or near the mouth of the fractures thereby strengthening the formation;
   (c) thereafter continuing to drill the wellbore with the pressure in the wellbore maintained at above the initial fracture pressure of the formation and below the breakdown pressure of the strengthened formation.

2. A method as claimed in claim 1 wherein the pressure in the wellbore in step (c) is maintained at least 300 psi (2.07 MPa) above the initial fracture pressure of the formation and below the breakdown pressure of the strengthened formation.

3. A method as claimed in claim 1 or 2 wherein the solid particulate bridging material is added to a circulating drilling mud having an HTHP fluid loss value of less than 2 ml/30 minutes prior to increasing the pressure in the wellbore to above the initial fracture pressure of the formation.

4. A method as claimed in claim 1 or 2 wherein the strengthened formation is a depleted formation.

5. A method as claimed in claim 1 or 2 wherein the strengthened formation is a weak formation in a previously drilled section of wellbore.

6. A method as claimed in claim 5 wherein a pill of the drilling mud having a concentration of solid particulate bridging material of at least 50 lb per barrel (143 kg/m$^3$) is circulated to the weak formation and is squeezed into the weak formation with the pressure in the wellbore in the vicinity of the weak formation maintained at above the initial fracture pressure of the weak formation.

7. A method as claimed in claim 1 or 2 wherein the drilling mud has a HTHP fluid loss value of less than 1 ml/30 minutes.

8. A method as claimed in claim 7 wherein the drilling mud has a HTHP fluid loss value of less than 0.6 ml/30 minutes.

9. A method as claimed in claim 1 or 2 wherein the concentration of solid particulate bridging material in the circulating drilling mud is at least 10 lb per barrel (26.6 kg/m$^3$).

10. A method as claimed in claim 9 wherein the concentration of solid particulate bridging material in the circulating drilling mud is at least 10 lb per barrel (26.6 kg/m$^3$).

11. A method as claimed in claim 1 or 2 wherein the drilling mud is recycled to the wellbore after separating material having a size of greater than 500 microns therefrom using a 35 mesh screen (US sieve series).

12. A method as claimed in claim 11 wherein fresh solid particulate bridging material is added to the drilling mud prior to recycling the drilling mud to the wellbore.

13. A method as claimed in claim 1 wherein the drilling mud is recycled to the wellbore after separating drill cuttings from the drilling mud using a centrifuge or hydrocyclone.

14. A method according to claim 1 wherein the test temperature is in the range of 50 to 150° C.

15. A drilling mud composition comprising (a) an aqueous or oil based fluid; (b) at least one fluid loss additive at a concentration effective to achieve a high temperature high pressure (HTHP) fluid loss from the drilling mud of less than 2 ml/30 minutes wherein the HTHP fluid loss is determined using an HTHP test according to the specification of the American Petroleum Institute (API) that employs a pressurized cell fitted with a filtration medium comprising a standard hardened filter paper having a filtration are of 3.5 square inches ($2.258 \times 10^{-3}$ m$^2$) wherein the drilling mud is filtered using the cell at a temperature corresponding to the temperature in the wellbore and with a standard pressure differential across the filter paper of 500 psi (3.45 MPa) and wherein a filter cake is allowed to build up on the filter paper for a period of 30 minutes, and the volume of filtrate collected after this 30 minute period is doubled to give a corrected American Petroleum Institute (API) fluid loss value; and (c) a solid particulate bridging material having an average particle diameter in the range 50 to 1500 microns and a concentration of at least 0.5 pounds per barrel (1.43 kg/m$^3$).

16. A drilling mud composition as claimed in claim 15 having a specific gravity in the range 0.9 to 2.5.

17. A drilling mud composition as claimed in claim 15 or 16 wherein the solid particulate bridging material comprises at least one substantially crush resistant particulate solid selected from the group consisting of graphite, calcium carbonate, dolomite, celluloses, micas, sand and ceramic particles.

18. A drilling mud composition as claimed in claim 17 wherein the solid particulate bridging material comprises marble.

19. A drilling mud composition as claimed in claim 15 wherein the concentration of the solid particulate bridging material is at least 10 pounds per barrel (28.6 kg/m$^3$).

20. A drilling mud composition as claimed in claim 19 wherein the concentration of the solid particulate bridging material is at least 15 pounds per barrel (42.9 kg/m$^3$).

21. A drilling mud composition as claimed in claim 15 wherein the solid particulate bridging material has an average particle diameter in the range 250 to 1000 microns.

22. A drilling mud composition as claimed in claim 15 having an HTHP fluid loss value of less than 1 ml/30 minutes.

23. A drilling mud composition as claimed in claim 22 having an HTHP fluid loss value of less than 0.5 ml/30 minutes.

24. A drilling mud composition as claimed in claim 15 wherein the fluid loss additive(s) is selected from organic polymers of natural or synthetic origin and finely dispersed clays.

25. A drilling mud composition according to claim 15 wherein the test temperature is in the range of 50 to 150° C.

* * * * *